Nov. 1, 1966 I. R. MARCUS 3,283,173
POWER-SAVING DEVICE FOR DIGITAL CIRCUITRY
Filed Nov. 19, 1963 2 Sheets-Sheet 1

INVENTOR,
IRA R. MARCUS

BY Harry M. Saragovitz,
Edward J. Kelly,
Herbert Berl &
L. J. Marhoefer

INVENTOR,
IRA R. MARCUS
BY Harry M. Saragovitz,
Edward J. Kelly,
Herbert Berl &
L. I. Marhoefer United States Patent Office 3,283,173
Patented Nov. 1, 1966

3,283,173

POWER-SAVING DEVICE FOR DIGITAL CIRCUITRY

Ira R. Marcus, Wheaton, Md., assignor to the United States of America as represented by the Secretary of the Army Filed Nov. 19, 1963, Ser. No. 324,896
8 Claims. (Cl. 307—88.5)

The invention described herein may be manufactured and used by or for the Government of the United States of America for governmental purposes without the payment to me of any royalty thereon.

This invention relates to electronic circuitry, and more particularly to an improved method and means for operating electronic digital circuitry.

An object of this invention is to provide a method and apparatus for the efficient operation of electronic digital circuits which require power to maintain their memory state. Vacuum tube, transistor, and gas tube counters are common embodiments of digital circuits which may be so characterized. In many applications, especially those involving light weight portable devices, it is necessary that overall power requirements of the digital counters be kept to a minimum. When the digital circuit itself is designed to have low power requirements, circuit reliability and speed is compromised. This invention contemplates the operation of reliable, high powered digital electronic circuits at low overall average power.

Another object of this invention is to improve the reliability of digital electronic circuits includng those employing magnetic cores.

Digital counter circuits may be considered to have two states. One is a memory state, where the information stored in the counter is merely held, or remembered, awaiting a computing command signal. The other state is the count or compute state. The power requirements for these two states are not the same. Many digital counters require less power to maintain their relatively quiescent memory state than is required to compute, count, or handle newly received information in a fast and efficient manner. In this type of digital counter this invention contemplates operating the counter at two distinct power levels: a first power level denominated "memory power level," while the counter is in its quiescent memory state, and a second power level denominated "operating power level," while information signals are received and handled.

The method and apparatus of this invention also provide for more reliable operation, in addition to better efficiency for certain types of circuits. The principles and teachings of this invention may be advantageously applied in a slightly modified form to circuits which do not require power to maintain them in their memory state. Magnetic core computer circuits are in this class. By removing power to the drive circuitry during the period between information pulses, the likelihood of pulse counting due to spurious signals is reduced.

The specific nature of the invention, as well as other objects, aspects, uses and advantages thereof, will clearly appear from the following description and from the accompanying drawings, in which.

The principles of this invention will be described in connection with FIGS. 1 and 2. A pulse generator 11 supplies an information signal which is to be acted upon by a digital counter 12. The particular counter circuit 12 forms no part of this invention. However, one type counter to which the principles of this invention are particularly well suited is the type comprising a plurality of vacuum tube or transistor Eccles-Jordan flip-flop circuits. Since these and most counter circuits are primarily resistive, the amount of energy needed to operate the circuit is proportional to supply voltage. FIG. 2*g* represents the typical voltage (power) requirements for a vacuum tube flip-flop circuit. The voltage $v_0$ is a zero voltage reference value; the voltage $v_m$ is the "memory voltage level" required to maintain conduction through one of the vacuum tubes when the circuit is in either of its stable states; and $v_c$ is the "counting voltage level" which must be maintained across the tube to insure reliable switching from one tube to the other in response to a signal pulse.

Figure 1:
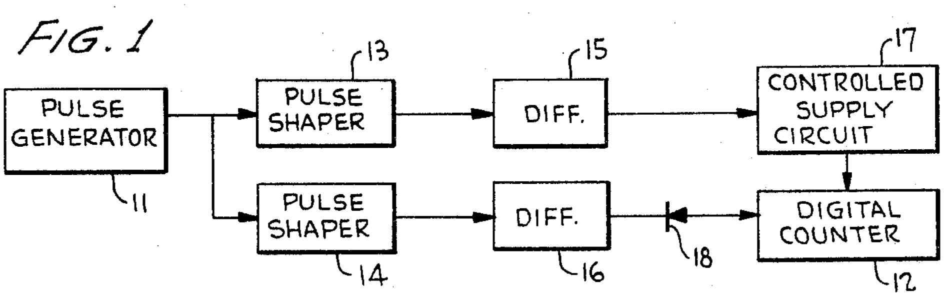
FIG. 1 shows in block diagram form one embodiment of this invention.
Figure 2:
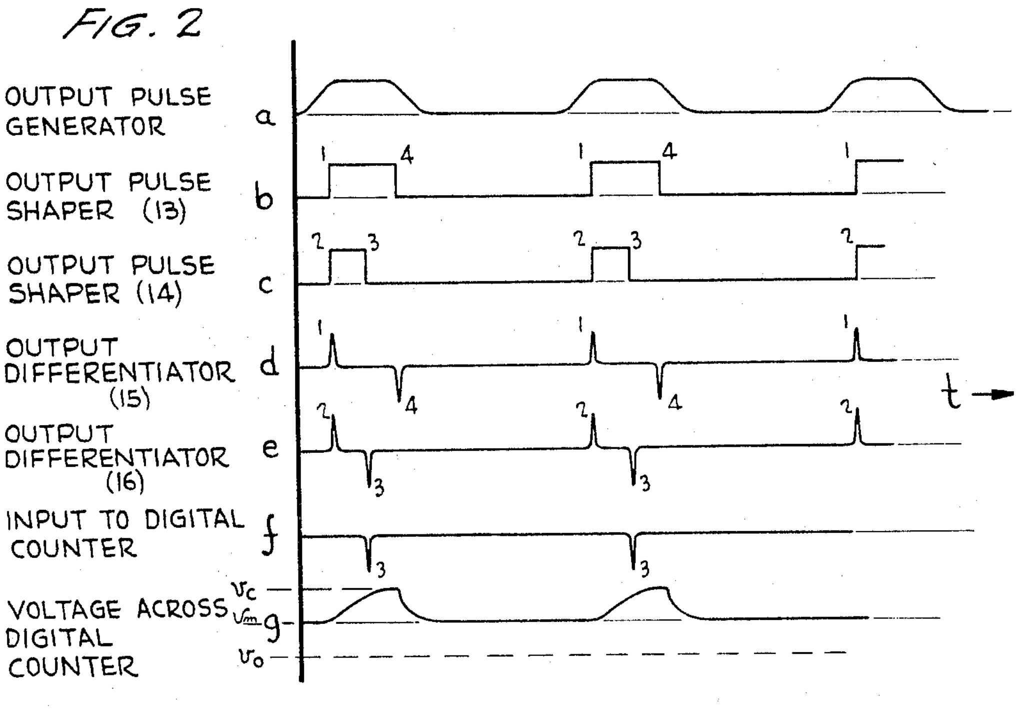
FIG. 2 shows idealized wave forms generated by the various components of FIG. 1, and indicates the time sequence of operation.

In order to provide the two level power supply operation for the digital counter 12 in the embodiment of FIG. 1, pulse shapers 13 and 14, differentiators 15 and 16, and a controlled supply circuit 17 are used. A typical wave form for the pulse generator 11 is shown in FIG. 2*a*, and these pulses serve as the information signal to counter 12. As shown in FIG. 1, the pulses are fed in parallel to pulse shapers 13 and 14. Monostable (1-shot) multivibrators are suitable circuits for use as pulse shapers 13 and 14. The one-shot multivibrators 13 and 14 are quiescent until action is initiated by a pulse received from pulse generator 11. Each multivibrator then goes through one cycle of operation, after which it reverts to its original quiescent condition provided the initiating pulse is no longer present. The output of pulse shaper 13 is shown in FIG. 2*b*, and the output of pulse shaper 14 is shown in FIG. 2*c*. As is apparent, these outputs are a series of square wave pulses, the duration of the pulses produced by 13 being longer than those produced by 14.

The output of the pulse shaper 13 is fed into a differentiating circuit 15 which produces a series of alternate positive and negative spiked pulses at its output, as shown in FIG. 2*d*. Similarly, the output of pulse shaper 14 is fed to differentiating circuit 16 which produces positive and negative spiked pulses as shown in FIG. 2*e*. The spikes of FIGS. 2*d* and 2*e* are numbered 1, 2, 3 and 4 to indicate their relative time sequence of generation. The pulse spikes 1 and 2 are generated simultaneously as the leading edge of the square waves, shown in FIGS. 2*b* and 2*c*, are fed to their respective differentiators 15 and 16. The negative spike 3 is the output of differentiator 16 generated at the trailing edge of the square wave pulse from pulse shaper 14. Similarly, the trailing edge of the square wave produced by pulse shaper 13, gives a negative spike indicated at 4. The positive spikes 2 from differentiator 16 are blocked by diode 18, and the digital counter 12 is designed to count the negative spikes 3, which are shown in FIG. 2*f*.

The positive spike 1 from differentiator 15 is applied to controlled supply circuit 17 and initiates the rise in the supply voltage for digital counter 12. The voltage gradually rises from a memory value $v_m$ to an operating value $v_c$ and is gradually returned to the memory value $v_m$ by the subsequent negative spike 4 received from differentiator 15. Between the spikes 1 and 4 in time, the information spike 3 occurs and is applied to the counter 12 when the supply voltage is at an operating value $v_c$. In this manner, high speed, reliable computing is accomplished, while the average power needed is only slightly greater than that corresponding to a memory voltage of $v_m$.

Figure 3:
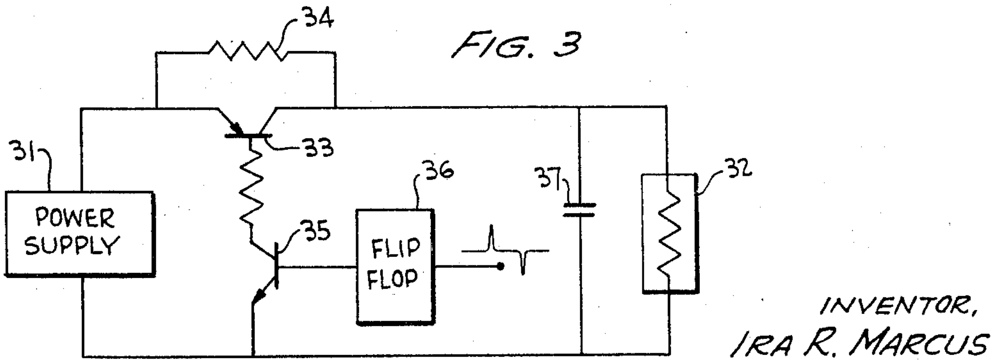
FIG. 3 is a schematic diagram of one embodiment of a two level power supply.

FIG. 3 shows a schematic diagram of one embodiment of a controlled power supply circuit which may be used in the practice of this invention. In the circuit of FIG. 3, 31 denotes a power supply having a value at least equal to, and preferably slightly greater than, the operating voltage for the digital counter 12, $v_c$. A load 32 represents the connected counter 12. Connected between the source 31 and the load 32 is a transistor 33 and a shunting resistor 34. The value of the resistor 34 is arranged relative to the value of the load resistance 32 so that when the transistor 33 is not conducting the voltage across the load 32 is the memory value $v_m$. Transistor 35, which controls the base current of transistor 33, controls the current through transistor 33. When transistor 35 is conducting ,transistor 33 is conducting, and when transistor 35 is cut-off, transistor 33 is cut-off. Transistor 35 is under the control of a flip-flop circuit 36, which raises the base voltage of the transistor 35 in response to the positive spike 1 from differentiator 15, and maintains this base voltage until triggered by the negative spike 4, also from differentiator 15. If desired, an additional pulse shaping circuitry may be included between the flip-flop and the differentiator circuit to properly shape spike 1 and spike 4 to reliably trigger flip-flop 36.

It is important that the fluctuation in the controlled supply voltage does not itself cause a false count in the digital circuit. A false count is prevented by having a relatively gradual rise to the operating voltage $v_c$ and a gradual fall to the memory voltage $v_m$. In the circuit of FIG. 3, this smoothing function is accomplished by capacitor 37. When the transistor 33 begins to conduct, and the supply voltage 31 is essentially placed across the load 32, the capacitor 37 begins to charge, giving a rise time for the voltage across the load 32 proportional the RC time constant of the circuit. Similarly, as the voltage across the load 32 begins to drop after the transistor 33 stops conducting, the capacitor 37 discharges into the load, giving a fall time also proportional to the RC time constant. The rise and fall time of the supply voltage should be slow enough not to trigger a false count in the counter 12.

Figures 4, 5:
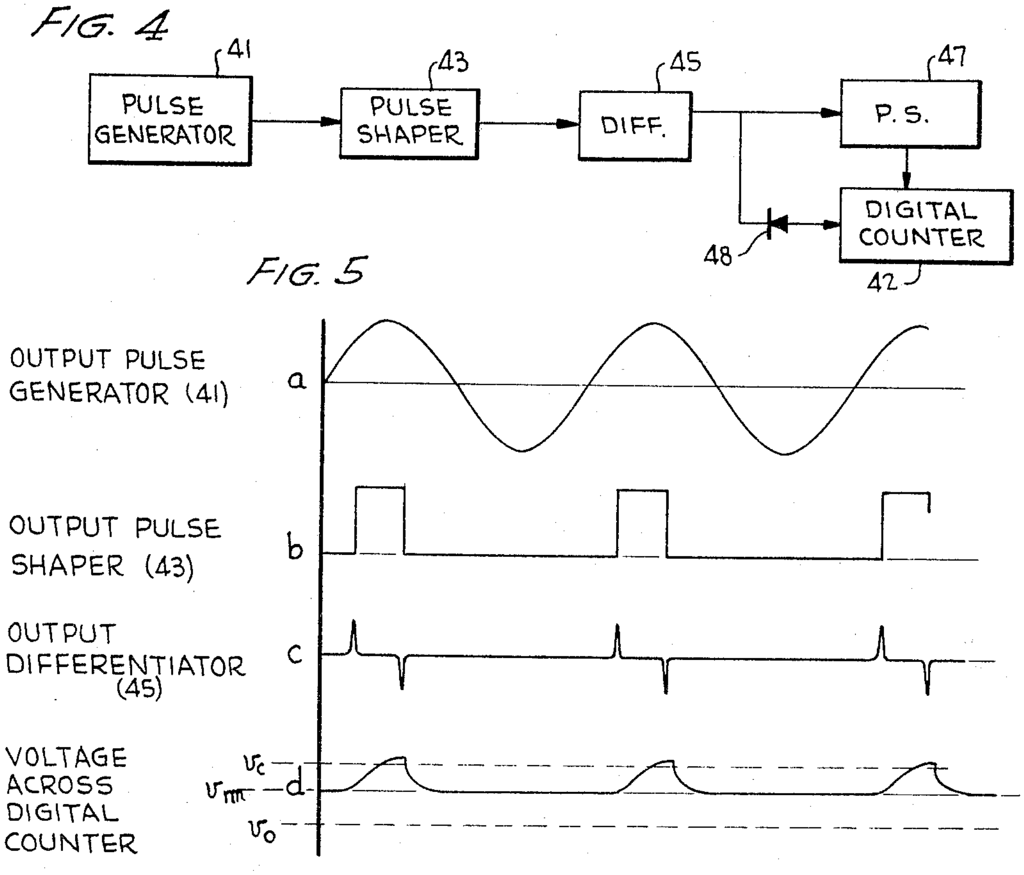
FIG. 4 is a block diagram of a preferred embodiment of this invention.
FIG. 5 is a timing sequence diagram for the embodiment of FIG. 4, similar to FIG. 2.

FIGS. 4 and 5 illustrate an alternate embodiment of this invention. They point out an additional feature which may be used equally well with either the embodiments of FIG. 1 or 3. Again, there is a pulse generator 41 which generates the information pulses which are to be counted by digital counter 42. The embodiment of FIG. 4 differs from that of FIG. 1 in that it is able to operate the digital counter 42 at the two power levels, memory and operate, using only a single pulse shaper and differentiator. The output of pulse generator 41, shown in FIG. 5*a*, is fed to a pulse shaper 43. Pulse shaper 43 puts out a single fixed duration pulse, as shown in FIG. 5*b*, for each cycle of the pulse generator 41. As maybe seen from an inspection of FIG. 5, the duration of the pulse produced by pulse shaper 43 is considerably less than ½ cycle of the pulse generator 41. This technique allows a power saving in excess of fifty percent, and this same technique is also applicable to the embodiment shown in FIG. 1.

The output of pulse shaper 43 is differentiated in differentiator 45 giving a series of alternate positive and negative voltage spikes as shown in FIG. 5*c*. These voltage spikes are fed to the control power supply 47 and the digital counter 42 in parallel. The positive spike is rejected from the digital counter 42 by diode 48. The positive spike from differentiator 45 fed to power supply 47 initiates the rise in voltage from the memory value $v_m$ to a value slightly above the operating voltage $v_c$, as is shown in FIG. 5*d*. The subsequent negative spike initiates the return of the power supply voltage from this raised level to the memory level $v_m$. The digital counter 42 is designed to compute in response to the negative spikes from differentiator 45. The computer 42 is able to handle these negative information spikes, even though a simultaneous negative spike initiates the return of the power supply voltage to the memory level $v_m$. Because the power supply voltage does not drop immediately, but rather falls at a controlled rate, it can be designed to remain above the operating level $v_c$ for a sufficient time after the receipt of the negative pulse to allow computation of the information signal.

Several additional modifications and features may be incorporated within the scope of this invention. For example, in some applications, where high speed counting is involved, it may be advantageous to incorporate in the pulses shapers 13 and 14 of FIG. 1 and 43 of FIG. 4 a scaling factor. That is, in some applications it would be permissible to generate a single square wave output pulse for every *n* input signals, where *n* is the scaling factor. The simplest case would be $n=2$. This downward scaling would allow more time for the increase and decrease of the power supply voltage between the memory and computing levels.

As will be apparent to those skilled in the art, the pulse shaper 43 in the embodiment of FIG. 4 will not be absolutely essential in all applications. Occasionally, depending primarily on the wave form of the information pulses, it may be satisfactory to differentiate the information pulses directly, the remainder of the operation being essentially as described in connection with FIG. 4.

Figure 6:
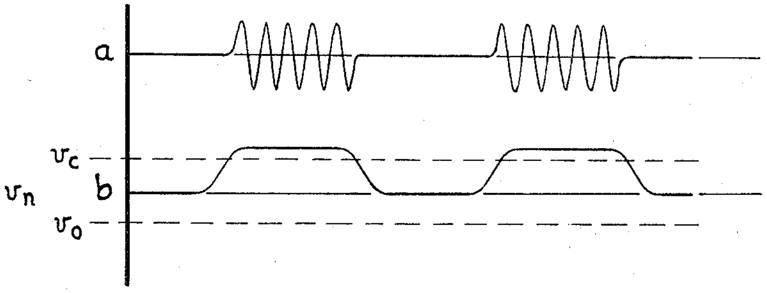
FIG. 6 is a waveform diagram useful in explaining another application of the principles of this invention.

One further modification of this invention may best be described in connection with FIG. 6. In some applications there will be a series of high speed information pulses separated by periods of no information as represented in FIG. 6*a*. Where the information pulse repetition rate is very high it may not be practical to raise and lower the power supply voltage between each information pulse. However, improved efficiency may still be obtained, where the maximum duration of periodic series of information pulses is known, by raising the supply power to the operating level in response to the first information pulse of the series and maintaining it there for a fixed duration, after which it can revert to its memory level. As will be apparent, this may be accomplished by merely substituting for the flip-flop circuit 36 in FIG. 3, a single shot multivibrator similar to those employed as pulse shapers in the embodiments of FIGS. 1 and 3. Of course, if the interval between the series of information pulses is sufficiently long, and there is an indication of when the series is completed, the voltage may be lowered from its operating state to its memory state manually, or semiautomatically.

While this invention has been described with more particularity in connection with transistor, vacuum tube, and glow tube counter circuits, in a modified form its principles may also be applied to magnetic core type counter circuits. As will be apparent to those skilled in the art, the only modification that need be made to apply the teachings of this invention to magnetic core type circuits is the removal resistor 34 in the circuit of FIG. 3. That is, in the memory state, the drive circuit for the magnetic core counter should be completely disconnected. While this does not result in any appreciable saving in power supply requirements, it does insure that noise signals will not adversely affect the digital counter.

It will be apparent that the embodiments shown are only exemplary and that various modifications can be made in construction and arrangement within the scope of the invention as defined in the appended claims.

I claim as my invention:

1. In combination with an input pulse source and a digital counter for electrical pulses, said counter having a power input terminal and an actuating-pulse terminal, said counter requiring a minimum counting voltage $v_c$ at said power input terminal to enable said counter to count pulses applied to said actuating-pulse terminal, said counter requiring a minimum memory voltage $v_m$ at said power input terminal to enable said counter to retain in its memory pulses that have been counted, $v_m$ being less than $v_c$, an improvement for reducing the average power required for operation of said counter, said improvement comprising:
 (a) a power supply having an output terminal and a control terminal, said output terminal connected to said power input terminal;
 (b) said power supply applying a quiescent voltage to said power input terminal of at least $v_m$ but less than $v_c$;
 (c) said power supply being adapted, in response to voltage information applied to said control terminal, to increase the voltage at said power input terminal to a value at least equal to $v_c$ for a period at least long enough to permit said counter to respond to an actuating pulse applied to said actuating pulse terminal and to thereafter reduce the voltage at said power input terminal to said quiescent value;
 (d) first means connected between said input pulse source and said control terminal for supplying voltage information to said control terminal in response to an input pulse from said input pulse source; and
 (e) second means connected between said input pulse source and said actuating-pulse terminal for supplying a slightly delayed actuating pulse to said actuating-pulse terminal in response to an input pulse from said input pulse source;
 (f) whereby in response to an input pulse from said input pulse source the voltage at said power input terminal is raised to a value at least equal to $v_c$ for a limited period and an actuating pulse is received at said actuating pulse terminal and counted by said counter during said limited period, the voltage at said power input terminal thereafter returning to its quiescent value.

2. The combination according to claim 1 wherein said voltage information consists of a first voltage spike that initiates an increase in the voltage at said power input terminal followed by a second voltage spike that initiates a decrease in the voltage at said power input terminal.

3. The combination according to claim 2 wherein said first and second voltage spikes are of opposite polarity.

4. The combination according to claim 3 wherein:
 (a) said first means comprises:
  (1) a first pulse shaper, and
  (2) a first differentiator,
  (3) said first pulse shaper having its input connected to receive input pulses from said input pulse source and having its output connected to the input of said first differentiator, the output of said first differentiator being connected to said control terminal,
  (4) the output of said first pulse shaper in response to an input pulse from said input pulse source being a substantially square wave and the resulting output of said differentiator being a first pair of pulses of opposite polarity corresponding to the leading and trailing edges of said square wave; and (b) said second means comprises:
  (1) a second pulse shaper,
  (2) a second differentiator, and
  (3) a diode
  (4) said second pulse shaper having its input connected to receive input pulses from said input pulse source and having its output connected to the input of said second differentiator, the output of said second differentiator being connected through said diode to said actuating pulse terminal,
  (5) the output of said second pulse shaper in response to an input pulse from said input pulse source being a substantially square wave of shorter duration than said first-mentioned square wave and the resulting output of said differentiator being a second pair of pulses of opposite polarity corresponding to the leading and trailing edges of said square wave, said diode being so connected as to block the first of said second pair of pulses and to pass the second of said second pair of pulses to said actuating pulse terminal to actuate said counter.

5. The combination according to claim 4, said power supply comprising:
 (a) an invariant D.-C. power source,
 (b) a resistive connection between said invariant D.-C. power source and said output terminal, and
 (c) third means connected to said control terminal for lowering the resistance of said resistive connection from a first value to a second value in response to the first of said first pair of pulses and for raising the resistance of said resistive connection from said second value to said first value in response to the second of said first pair of pulses.

6. The combination according to claim 5, said power supply comprising additionally a capacitance connected between said output terminal and circuit ground.

7. The combination according to claim 6 wherein said resistive connection comprises a resistor shunted by the emitter and collector terminals of a transistor and wherein said third means comprises:
 (a) a second transistor and a second resistor, one terminal of said second resistor connected to the base of said first transistor, the other terminal of said second resistor connected to the collector of said second transistor, the emitter of said second transistor connected to circuit ground, and
 (b) a flip-flop circuit having its output connected to the base of said second transistor and its input connected to said control terminal.

8. The combination according to claim 3 wherein:
 (a) said first means comprises:
  (1) a pulse shaper
  (2) a differentiator,
  (3) said pulse shaper having its input connected to receive input pulses from said input pulse source and having its output connected to the input of said differentiator, the output of said differentiator being connected to said control terminal,
  (4) the output of said pulse shaper in response to an input pulse from said input pulse source being a substantially square wave and the resulting output of said differentiator being a pair of pulses of opposite polarity corresponding to the leading and trailing edges of said square wave; and
 (b) said second means comprises
  (1) said pulse shaper,
  (2) said differentiator, and
  (3) a diode connected between the output of said differentiator and said actuating-pulse terminal, the polarity of said diode being such as to block the first of said pair of pulses and to pass the second of said pair of pulses;
 (c) said power supply being adapted to increase the voltage at said power terminal to a value greater than $v_c$ in response to the first of said pair of pulses and to decrease the voltage at said power terminal to said quiescent value in response to the second of said pair of pulses, said power supply having a delayed voltage-decline characteristic whereby the voltage at said power terminals remains at least $v_c$ for a sufficient time after the second of said pair of pulses to permit said counter to respond to said second of said pair of pulses.

References Cited by the Examiner

UNITED STATES PATENTS

| | | | |
|---|---|---|---|
| 2,666,150 | 1/1954 | Blakely | 307—88.5 |
| 3,101,441 | 8/1963 | Curry | 307—88.5 X |
| 3,151,289 | 9/1964 | Harpley | 307—88.5 X |

ARTHUR GAUSS, *Primary Examiner.*

J. S. HEYMAN, *Assistant Examiner.*